United States Patent [19]

Chazal et al.

[11] Patent Number: 4,555,381

[45] Date of Patent: Nov. 26, 1985

[54] PROCESS OF MAKING FOLDED CARDBOARD CONTAINER COVERED BY A LAYER OF SYNTHETIC MATERIAL AND PROVIDED WITH A PERIPHERAL FRAME

[75] Inventors: Guy A. Chazal, Sannois; Jean A. Bodet, Versailles, both of France

[73] Assignee: Societe Parisienne d'Impression et de Cartonnage, Haute de Seine, France

[21] Appl. No.: 477,951

[22] Filed: Mar. 23, 1983

Related U.S. Application Data

[62] Division of Ser. No. 307,833, Oct. 2, 1981.

[30] Foreign Application Priority Data

Nov. 7, 1980 [FR]  France ............................ 80 23782

[51] Int. Cl.[4] .................... B29C 17/04; B29D 3/02; B31F 1/00
[52] U.S. Cl. ................................. 264/516; 264/512; 156/224; 156/245; 156/287
[58] Field of Search ............ 264/511, 512, 516; 156/224, 287, 245; 493/94, 102, 113, 167

[56] References Cited

U.S. PATENT DOCUMENTS

| | | | |
|---|---|---|---|
| 3,104,012 | 9/1963 | Beamish | 229/2.5 X |
| 3,489,331 | 1/1970 | Andersson | 229/31 R X |
| 3,512,332 | 5/1970 | Klein | 156/224 X |
| 3,765,976 | 10/1973 | Nasica | 264/516 X |
| 4,105,153 | 8/1978 | Locke | 229/23 R |

FOREIGN PATENT DOCUMENTS

2036082  5/1972  Fed. Rep. of Germany.
2404566  4/1979  France.

*Primary Examiner*—Jan Silbaugh
*Attorney, Agent, or Firm*—Kuhn Muller and Bazerman

[57] ABSTRACT

A process of making a container of the dishtype, including, on the one hand, a bottom 40, walls 31 to 34 and 41 to 44 and edges 30a to 30d of exterior cardboard and, on the other hand, of a thermo-formed layer 2 of synthetic material. The edges 30a to 30d are constituted by the sides of a frame 30 and are in one piece. The frame 30 is integral with the walls 31 to 34, bent downward. The bottom 40 is integral with the walls 41 to 44, bent upward and complimentary to the walls 31 to 34. All walls are placed so as to be on the same level and are maintained by the layer 2.

5 Claims, 22 Drawing Figures

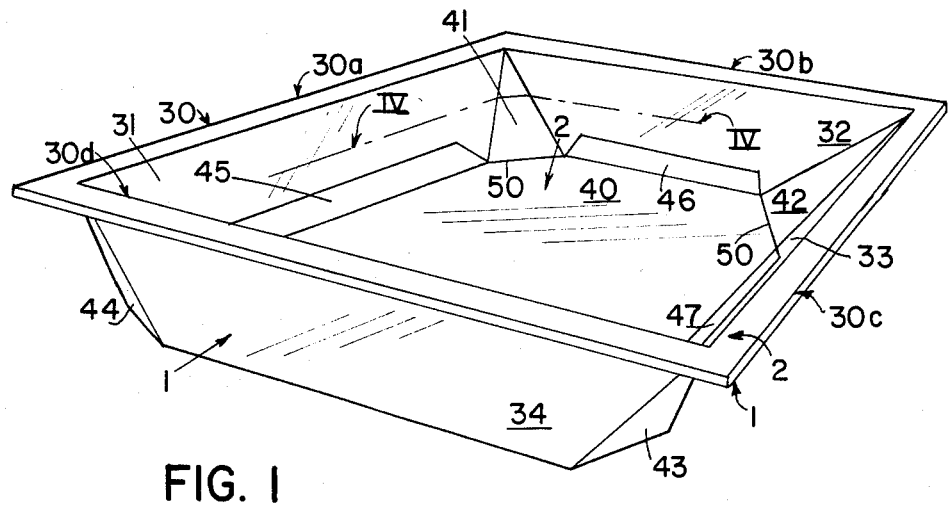
FIG. 1
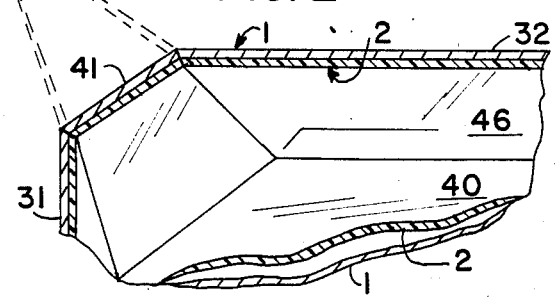
FIG. 2
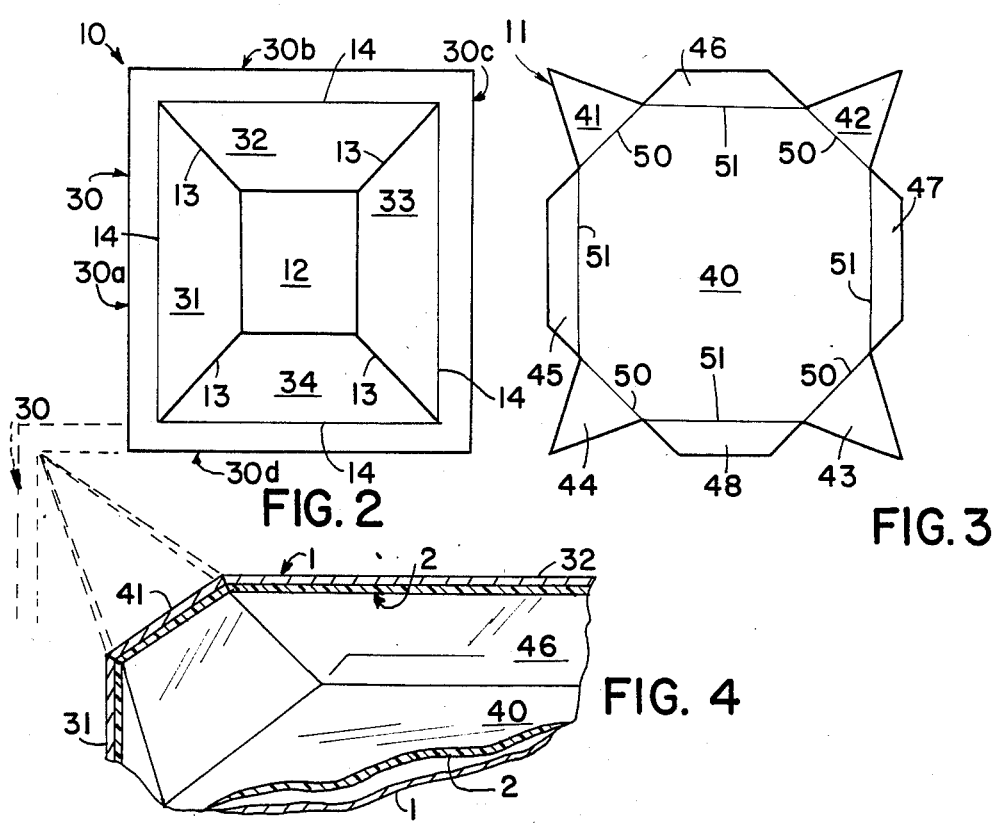
FIG. 3
FIG. 4

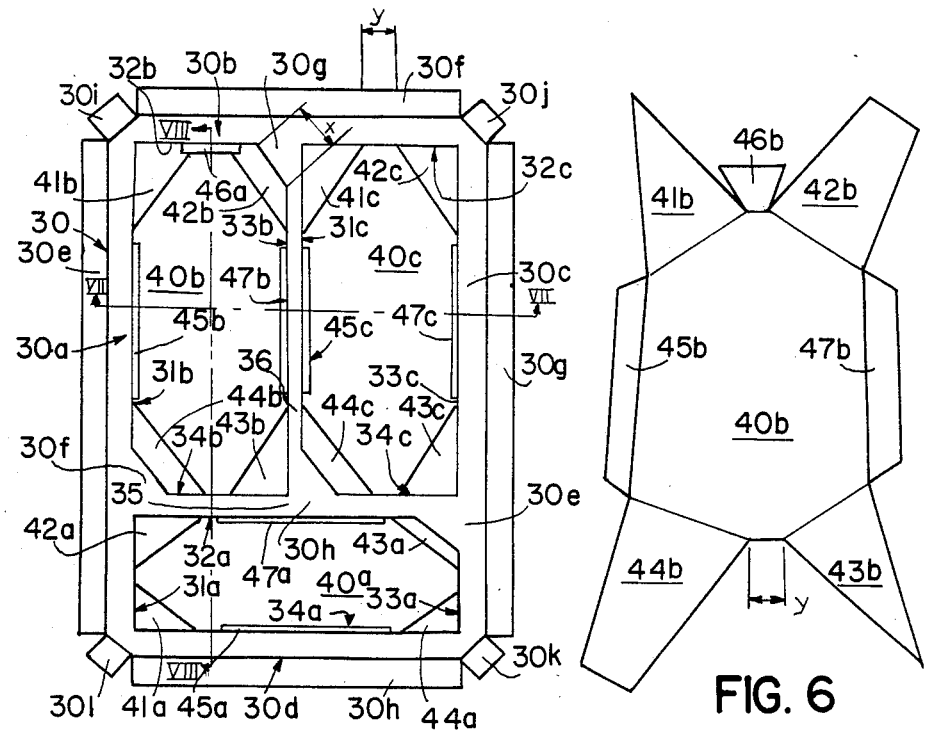
FIG. 5
FIG. 6
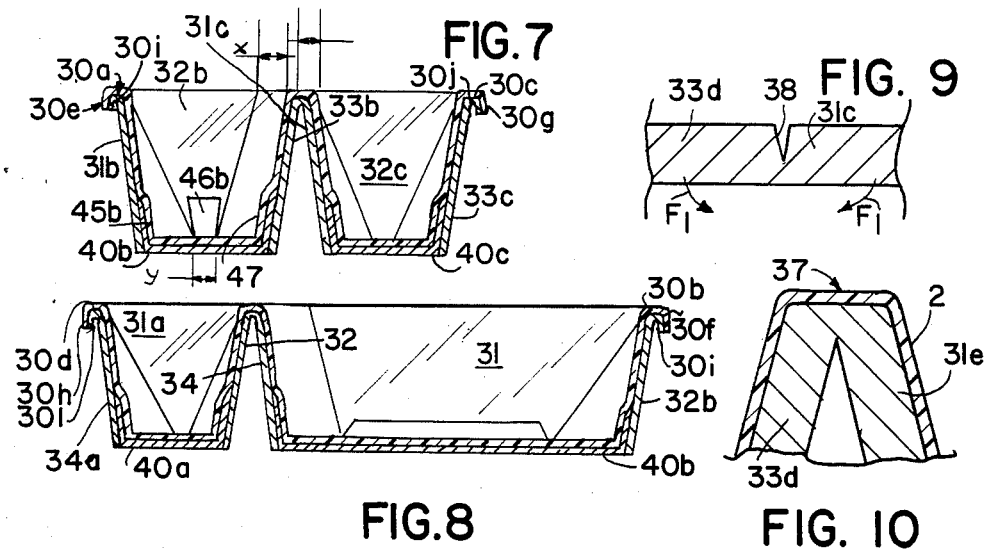
FIG. 7
FIG. 8
FIG. 9
FIG. 10

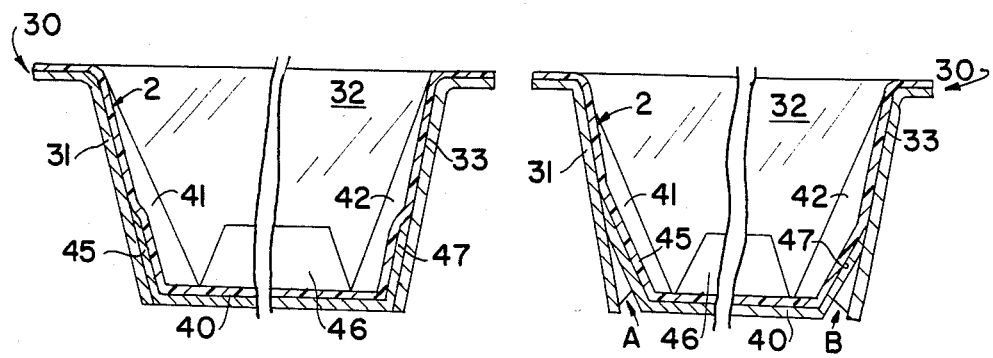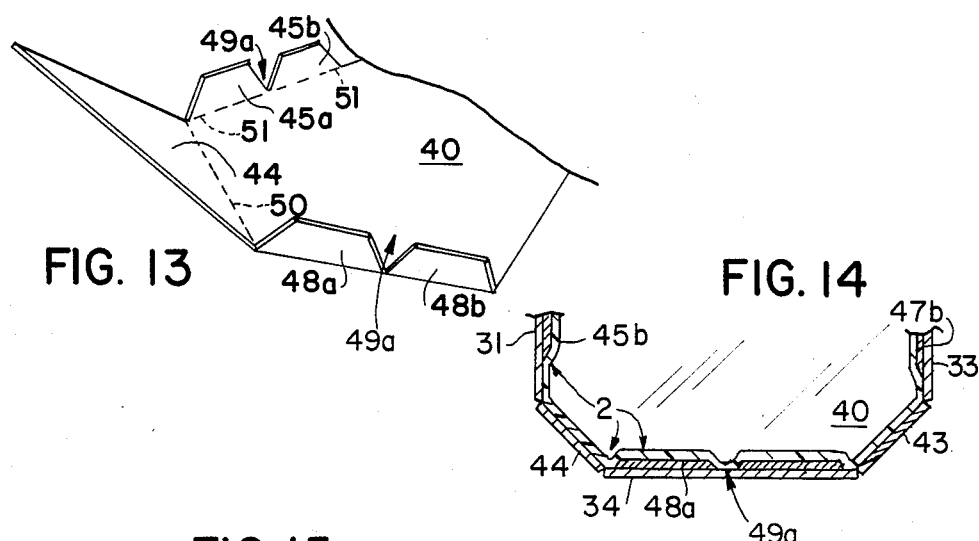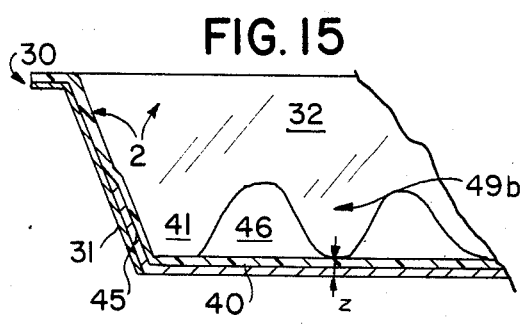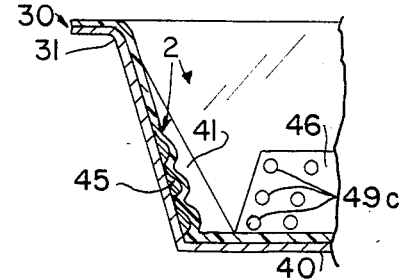

PROCESS OF MAKING FOLDED CARDBOARD CONTAINER COVERED BY A LAYER OF SYNTHETIC MATERIAL AND PROVIDED WITH A PERIPHERAL FRAME

This is a division of application Ser. No. 307,833 filed Oct. 2, 1981.

BACKGROUND OF THE INVENTION

Folded cardboard containers are known in which the inside of the container is covered with a layer of thermo-formed synthetic material and in which the container has upper edges formed in a kind of a platform. The platform provides a reinforcement of the circumference of the container (which may be in the shape of a dish) and the a surface for receiving a cover. The cover may be fixed to the platform by gluing or heat joining.

This type of packaging is normally used for receiving food products, some of which are liquid. It is therefore necessary for the containers to be fluid tight, which means that the layer of synthetic material is uniformly spread over, without any irregularity, on the bottom, at the walls and on the platform. It is truly important that there be no hole in the layer because the container itself does not have the same quality of tightness as the synthetic material. In addition, it is indispensible that the platform be perfectly plane since it is intended for receiving the cover, the fixing of which is an essential element of the tightness of the container.

It is very difficult to obtain upper edges in a regular, uniform and industrially feasible way. As a matter of fact, for obtaining an economic container, it is necessary to form the body of the container from cut and grooved blanks which can be stored flat and to use a very thin synthetic material. This structure is capable of being assembled by low-cost automatic means, or by manual labor, by thermo-forming of the synthetic layer onto a die in which the cardboard blank is placed, and kept, while covered by the layer which is attached to the entire surface.

To obtain a container of this type, a cardboard blank is used which is cut and grooved. It is flat and is put in the desired form by at least two inverse folds for each face, i.e. a fold toward the upper part of the wall relative to the bottom, and a fold of the edges toward the bottom with respect to the upper end of the walls.

As explained above, it is necessary that the edges constitute a platform which is completely plane for esthetic reasons, to avoid obstruction in stockpiling and to attain perfection in covering the container.

In spite of the improvements carried out by the applicants themselves, as disclosed in the French Patent Application 77/29714 of Oct. 3, 1977, the attainment of such a platform remains a difficult operation, i.e. with respect to manufacturing, because for a hundred containers made, a few are found which must be reworked due to faults in joining and lowered edges. Also known is German Pat. No. 1.486.954 which relates to a package comprising a frame in one piece and walls jointed on this frame. The package disclosed in the German patent, however, neither comprises the bottom nor the continuous cardboard wall and, as seen in particular in FIG. 2, the cardboard portions are the frame and the walls, whereas the bottom 22 and the walls and are made of synthetic material.

In German Pat. No. 2.036.082, a cardboard box is described which comprises a detachable portion of double walls being placed between the walls of the actual box and the inner walls resulting from the cutting and folding of the bottom which, for this reason, does not exist any more.

These arrangements differ substantially from those of the present invention with respect to numerous points, i.e.:

1. The bottom of such a package is added and is not part of any of the elements previously described.
2. The upper and lower walls, respectively, are not aligned in the normal manner which is in the same plane, but are so placed that the ones are behind the others, in four thicknesses for each side altogether.
3. The upper and lower portions are not interconnected.
4. The upper and lower portions are only united by means of a third element which is another cardboard container having gluing flanges and a jointed cover.

SUMMARY OF THE INVENTION

In accordance with the present invention a container is provided which comprises a portion of cardboard and a thermo-formed layer of synthetic material have together a bottom, walls which are distributed over the entire periphery and a rim in one piece which is absolutely perfect and is positioned in a clearly determined plane.

BRIEF DESCRIPTION OF THE DRAWINGS

The invention can be understood best by reading the following detailed description in which reference is made to the attached drawings. It is to be noted that the description and drawings are not exclusive but give only examples.

FIG. 1 is a perspective, schematic view of a container according to the invention which is shaped as a simple dish;

FIGS. 2 and 3 are plan views of two cardboard blanks which are cut and grooved according to the invention;

FIG. 4 is a partial, schematic, sectional view along line IV—IV of FIG. 1;

FIG. 5 is a plan view of a container according to the invention which is made in form of a dish with three compartments, characterized by a peripheral frame and interior segments;

FIG. 6 is a plan view of a cardboard blank which is cut and grooved according to the invention for constituting a portion of the walls of a container according to FIG. 5;

FIG. 7 is a sectional schematic view along the line VII—VII in FIG. 5;

FIG. 8 is a sectional schematic view along line VIII—VIII of FIG. 5;

FIGS. 9 and 10 are partial schematic views which show an embodiment of an interior segment of the frame which allows the provision of two separate compartments;

FIGS. 11 and 12 are sectional schematic views of a dish according to the one in FIG. 1 which firstly show a bottom, suitably assembled, and, secondly, a bottom, suitably assembled but deformed;

FIGS. 13 and 14 are schematic views showing an embodiment which avoids the inconvenience shown in FIG. 12;

FIGS. 15 and 16 are partial schematic views which show two possible variations of allowing the avoidance of the drawback illustrated in FIG. 12;

DETAILED DESCRIPTION

Figure 17:
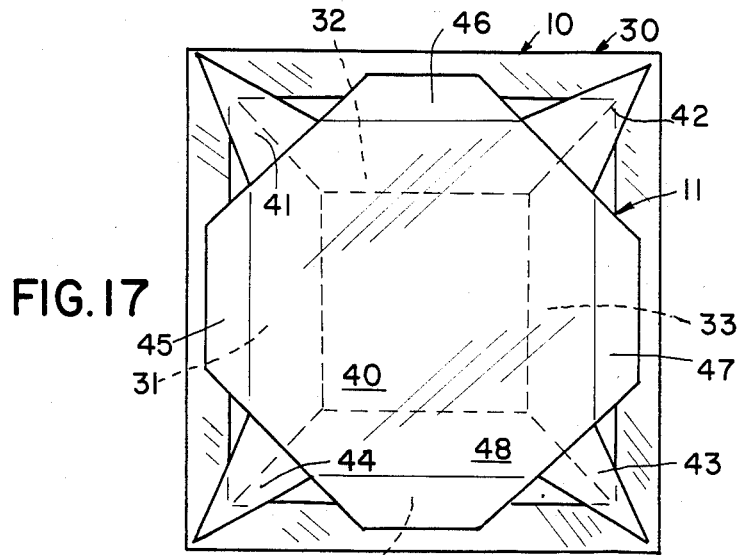
FIG. 17 shows two cardboard blanks according to the invention which are superimposed for being combined in one single mechanical operation in view of their fixing by means of a synthetic, thermo-formed layer.

Turning now to the drawings, it can be seen that a container according to the invention is of the type comprising a portion of exterior cardboard 1 and a portion of synthetic material 2 which are associated with each other in such a way that the cardboard portion 1 is cut and folded to form a unique cardboard frame 30 situated in one single plane, having panels or walls 31, 32, 33, 34, 41, 42, 43, 44 and at least one bottom 40. The whereas the portion of synthetic material 2 is formed of a single layer which is applied onto the entire surface of the cardboard portion, and constitutes the interior of the container and the exterior of the frame 30. The synthetic material 2 is adhered on the entire surface to stay in a good position on the frame 30, the walls 31 to 34 and 41 to 44 and the bottom 40. The assembly is characterized in that the side walls are made continuous by the lateral juxtaposition, upon one alignment of their faces, of the oblique sides of the panels 31, 32, 33 and 34 integral with the frame 30 panels 41, 44, 43 and 44 integral with and the bottom 40.

According to a feature of the invention, the bottom 40 (or each bottom when there are several as explained below) has integral flanges 45, 46, 47 and 48 which are bent upwardly. The flanges 45, 46, 47 and 48 are applied against the wall panels 31, 32, 33 and 34. The panels 31, 32, 33 and 34 are integral parts of the frame 30. Thus, the flanges 45, 46, 47 and 48 are mounted on the inner surface of the wall panels 31, 32, 33 and 34 with respect to the entire container.

According to the embodiment shown in FIGS. 1, 2 and 3, the container is quadrangular and comprises an octogonal bottom 40 having two sets of four opposed sides. A first set of four opposed sides is integral to a bottom base panel by the grooved lines 50 and comprises triangular panels 41, 42, 43 and 44. The triangular panels 41, 42, 43 and 44 are placed between the panels 31, 32, 33 and 34. The panels 31, 32, 33 and 34, as previously noted, are integral with the frame 30. The second set of four opposed sides comprise flanges 45, 46, 47 and 48 which are alternately positioned between the ones previously named, i.e. 41, 42, 43 and 44, and are integral to the bottom base plate by the groove lines 51. The flanges 45, 46, 47 and 48 are applied against the panels 31, 32, 33 and 34 which are integral with the frame 30.

It can be seen that in this embodiment the cardboard portion 1 is composed of two blanks which are obtained by cutting and grooving of a cardboard plate.

The blank 10 shown here is square and comprises a central hollow 12 of the same shape, extended by grooves 13 up to the groove lines 14 which are preferably formed by a half-depth cut.

A second blank 11 is cut in the form shown in FIG. 3 to illustrate the various elements already described above.

To obtain the complete cardboard portion and then the finished container, one can proceed as follows:

The blank 10 is placed onto a die of some sort while the frame 30 is placed on the periphery of said die, and the panels 31, 32, 33 and 34 which are integral with the frame 30 are bent, for example with a punch, toward the inside along the groove lines 14. While holding the frame 30 but removing the punch, the blank 11 is placed onto the blank 10 in such a manner that the two blanks have a correct position relative to each other, and with a punch, pressure is applied onto the bottom 40 to force it into engagement up to the bottom of the die, which causes the triangular panels 41, 42, 43 and 44 as well as the flanges 45, 46, 47 and 48 to bend upward along the groove lines 50 and 51, respectively.

The dimensions of the different elements as well as the slope given to the edges of the die corresponding to the slope of the panel 31, 32, 33 and 34 of the finished container are such that the triangular panels 41, 42, 43 and 44 find their place exactly between the panels 32, 33 and 34 which are integral with the frame 30, in such a manner that the inner walls of the container formed by the succession of the panels 31, 41, 32, 42, 33, 43, 34 and 44 are continuous since the panels, integral with the bottom 40, are juxtaposed side by side, as can be seen clearly in FIG. 4.

The two blanks 10 and 11, thus aligned, are kept tightly associated, then fixed in this definite position by means of a layer 2 which is thermo-formed, in order to adhere to the entire surface of the bottom 40, the inner walls 31, 41, 32, 42, 33, 43, 34 and 44 and the upper side of the frame 30.

The thermo-formed layer 2 thus assures the gluing of the aligned panels and in this manner provides for a perfect tightness. The reason is that it closes the small cracks and spaces which remain between the integral elements of the frame 30 and the integral elements of the bottom 40.

Moreover, the flanges 45, 46, 47 and 48 which engage the inner face of the panels 31, 32, 33 and 34 are fixed to these panels by the layer 2 in such a way that the bottom 40 is integral with the walls of each of the eight sides, either because of the triangular panels 41, 42, 43 and 44 or because of the flanges 45, 46, 47 and 48.

This guarantees considerable solidity of the container which can hold relatively heavy items.

In FIGS. 1 to 4 a container is shown which consists of a kind of dish having a single compartment. It can either be used in this form or can be closed by a cover consisting, for example, of a lid whose inner surface is covered, at least on its periphery, by a synthetic layer which can be associated with the one which covers the frame 30, either by gluing or heat-joining as is known in the art.

Due to the fact that the frame is obtained in a single piece by cutting of a single piece of cardboard, a cover is attained which is of high quality, because the absence of any irregularity on the surface of the sealing allows the attainment a tightness of 100%, and in an industrial manner, repeatedly and practically without rejects.

The flanges 45, 46, 47 and 48 are applied against the panels 31, 32, 33 and 34, not by closing a groove, but by reinforcing the solidity of the container by fixing the bottom to the panels which are integral with the frame 30.

The complete tightness thus attained does not impede the attachment of the layer, because said complete tightness is formed on a large surface and the difference in level is easily compensated by the synthetic layer which extends over this large surface.

The flanges 45, 46, 47 and 48 have the additional advantage of contributing to the rigidity of the package in constituting reinforcements opposite the lower edges of the container which reinforcements act like ribs.

One can, however, abstain from using the flanges 45, 46, 47 and 48 when the synthetic layer 2 is sufficiently resistant concerning its mechanical characteristics as well as its strength of adherence since the bottom 40 is sufficiently well attached to the panels which are integral with the frame 30.

The embodiments of FIGS. 1 to 4 shows a container according to the invention in the form of a simple dish with a single compartment for a uniform product or for products which can be mixed.

But the invention also provides for the manufacturing of containers with compartments for packaging together, under one single cover, several products which must not be mixed, and, in particular, foodstuffs.

According to one feature of the invention, the frame 30 comprises at least one interior segment 35-36 for at least two opposite panels 33a-31b, 34a and 32c, and the container comprises a bottom 40a-40b-40c which is integral with the panels 41a to 44a, 41b to 44b, 41c to 44c, on each side of the inner segments 35-46 to form the bottoms and walls of complete compartments, held together by the frame 30 and by the interior segment 35-36.

According to a modification of this embodiment, the container comprises at least two interior segments 35 and 36, one of which, at least, 35, extends transversely from one edge to the other 30a-30c of the frame 30, and the other one, 36, from one edge 30b of the frame 30 to the preceding segment 35 to constitute at least three complete compartments, held together by the frame 30 and the segments 35 and 36. In FIGS. 5 to 8 such as embodiment of the invention is shown, and it can be seen that one container comprises a blank for the frame 30 and its segments 35 and 36 as well as for all the panels integral therewith and which are in an arrangement of four for each compartment, in such a manner that one can make each one similar to that of the dish as shown in FIG. 1.

For this reason the same numerals combined with the letter a, b or c according to the respective compartment have been used.

The transverse segment 35 determines with the edges 30a, 30c and 30d a first compartment, the walls of which are formed by the combination of the panels 31a, 33a and 34a which are integral with the frame 30, and 32a which is integral with the segment 35, as well as the panels 41a, 42a, 43a and 44a which are integral with the bottom 40a.

In view of the oblong form of the compartments thus created, only two flanges 45a and 47a have been provided on the long sides, because on the short sides of the panels 31a and 33a are practically triangular in such a way that the bottom 40a is conventiently held by its panels.

Between the side 30b of the frame 30 and the segment 35 there is a second segment 36 which defines two analog compartments to the one just described.

For each of these two compartments there are three panels which are integral with the frame 30 (31b, 32b and 34b on the one part, 32c, 33c and 34c on the other part) and two panels which are integral with the segment 36 (33b on the one part, and 31c on the other part), as well as two bottoms, 40b and 40c respectively, which are integral with each of the respective panels 41b, 42b, 43b and 44b, as well as 41c, 42c, 43c and 44c.

With the two upper parallel compartments being of the same type as the transverse compartment, one finds here the gluing flanges 45b and 47b, respectively, on the one part and 45c and 47c on the other part.

According to a modification of the embodiment in which the frame comprises at least one interior segment, this segment has a length at the most equal to that of a side of the frame 30.

It is possible to fix the cover at the same time onto the four sides of the frame 30 and over the transverse segment, which means, in the case shown in FIGS. 5 to 8, that the attachment of the cover is carried out over the segments 35 and 36 and the four edges of the frame 30.

According to another modification, it is, however, also possible to provide that the interior segments have a size smaller than the edges of the frame 30.

In this case a narrow segment is fragile and can be damaged upon handling of the container, especially by tearing at the place where the segment joins the frame 30. To avoid this undesirable occurrence and, consequently, give the container more solidity, it is provided according to the invention that the segment (here the segments 35 and 36) is connected to the frame 30 by a reinforced bracket.

These arrangements are well illustrated in FIG. 5 where it is shown that the transverse segment 35 is connected to the edge 30c of the frame 30 by a bracket 30e which amounts to giving the segment 35 locally, i.e. the edge 30c of the frame 30, a larger size than the one it has in the unit.

For the same reason the segment 35 is connected to the edge 30a of the frame 30 by a bracket 30f.

What has been said about segment 35 also applies to segment 36, and it can be seen that the latter is on the one side connected to the edge 30b of the frame 30 by a bracket 30g and on the other side to the segment 35 by a bracket 30h.

It can be seen that on both ends of each of the segments 35 and 36 there is a bracket which increases their size locally and constitutes a kind of brace.

The presence of this bracket which forms a cut, flat surface at the place where an angle is needed for receiving a panel which is integral with the corresponding bottom, gives to the panel in question no longer the form of a triangle as was the case in FIG. 3, but the form of a trapezoid as shown in FIG. 6.

In FIG. 6, a cardboard blank is illustrated which comprises the bottom 40b and the different pieces which are integral therewith to constitute, in cooperation with the panels which are integral with the frame, the compartment which appears in the upper left of FIG. 5.

All the elements already described are shown there, and it is therefore not necessary to enumerate them again.

It is to be noted that the compartment which is limited on two sides by segments, comprises two brackets 30f and 30g, respectively.

The cardboard blank of FIG. 6 has two triangular panels 41b and 43b of the same type as the ones already described, whereas the panels 42*b* and 44*b* are trapezoidal so as to end in a side of the length x which corresponds exactly to the length of the corresponding brackets 30*f* and 30*g*, measured along the oblique line which connects the edge of the frame 30 with the corresponding segment.

This particular arrangement of the panels 42*b* and 44*b* is of no consequence with respect to obtaining a finished container, since the putting in place of the two blanks relative to each other is carried out in the same way as explained above.

The geometry of this arrangement has the result of giving to the trapezoidal panels 42*b* and 44*b* a greater slope than the one of the triangular panels 41*b* and 43*b*. This results in a slight decrease in the useful volume, but this decrease is small and insignificant with respect to the provision of the brackets for greater solidity of the container.

The oblong shape which is given to the compartments here leads to giving to the corresponding bottom 40 two large sides on which ther may be gluing fringes 45 and 47 and two small sides of the very small side y, even zero, if they join directly (in the manner of the two sides of an angle) the edges which face the two adjacent panels.

In the example shown, the distance y is small but at the same time substantial in such a way that it is possible either to let a free edge remain as the one which is visible in the case of FIG. 6, or to provide a flange 46*b*, substantially in the form shown in the upper part of the same FIG. 6.

Of course, it appears logical to provide in practice that the blank has either two free symmetrical edges or two symmetrical flanges of the type 46.

Both solutions have been shown in the same figure to simplify the drawing.

When the blank of FIG. 6 is put in place to contribute to the construction of the compartment positioned in the upper left in FIG. 5, the flange 46*b* is applied against the surface 32*b* which is integral with the frame 30 and is kept in this position by the thermo-formed layer 2 which has been described above and is shown in the left part of FIG. 7.

According to a modification of the invention, the frame 30 comprises the edges 30*e* to 30*l*, bent toward the outside to be substantially normal to the plane of the frame 30. Here, cut surfaces at four angles have been chosen. As a result, edges 30*i*, 30*j*, 30*k* and 30*l* have to be provided which are bent along each cut surface, if it is desired that all edges form a continuous unit. But it is possible not to provide these edges 30*i* to 30*l* if a discontinuous connection is accepted. It is, of course, also possible not to provide the cut surfaces.

These edges constitute with the frame 30*a* a kind of rigid angle, thanks to which the container resists bending, particularly along the transverse segment 35.

Consequently, one could be satisfied, theorectically, to provide only the edges 30*e* and 30*g* which are normal to the segment 35. In practice, however, it is preferable to provide also the edges 30*f* and 30*h* which serve to hold in place the edge 30*a* and 30*g* due to the fact that the layer 2 covers the frame 30 and all its edges.

As has been explained above, it is possible to give to the transverse segment (or to the transverse segments) any length which, in practice, must not exceed that of the edges of the frame 30.

It is also possible to create such a segment of very slight thickness which depends only of the thickness of the cardboard.

In FIGS. 9 and 10 such a modification is shown which is characterized in that the segment 37 is formed by the section of two opposed folded panels 33*d* and 33*e*, which are limited by a simple cut 38 in the cardboard, in such a way that the segment 37 is there in effect rather than in reality.

FIG. 9 is a section through a cardboard blank at the place where a transverse segment is to be created, and a very large scale has been adopted to show clearly how this modification is carried out.

The same numeral has been used for the panel as before, only the letters d and e have been added, respectively, so that a comparison can be made between the segment according to the present modification of FIGS. 5 and 7.

Instead of providing two groove lines for defining a segment of the type 36 which is integral with the pliable panels 33*b* and 33*c*, the cardboard blank has only a simple cut 38 at half depth in the axis of the segment to be created.

When the blank is to be formed, there follows folding of the panels 33*d* and 31*e* which are situated on both sides of the cut 38 in the sense of the arrows F 1 in such a manner that the two panels 33*d* and 33*e* are folded against each other without any substantial space therebetween as shown in FIG. 10.

When the container is finished by means of thermoforming of the thermo-plastic layer 2, the latter covers the panels 33*d* and 31*e* as well as the upper segment, the size of which is equal to the double thickness of the cardboard which serves as the blank.

In reality the thickness of the blank is such that the segment has a very insignificant size.

Of course, these arrangements do not make the joining of a cover onto such a segment easy. In practice, this solution is only chosen where the products placed into each of the two compartments separated by such a segment 37, are not liquid and must therefore not pass between the upper portion of the segment 37 and the cover, which is mainly the case when solid foodstuffs, like biscuits, are packed.

On the other hand, the advantage of such a fine segment is to attain a useful volume which is as large as possible, since the volume is not descreased by the presence of a separation of considerable size as is the case with segments 35 and 36. The useful volume is better if said segments have only the size of the edges of the frame 30.

In FIG. 11 it is shown how the layer 2 adheres to the bottom 40, the flanges 45, 46 and 47 as well as to the corresponding panels 31, 32 and 33 to make the unit more solid.

In this figure the theoretical case is shown where the panels 31 and 33 remain perfectly applied against the flanges 45 and 47, although on the right of the latter said panels are not glued to the outside.

In reality, an ungluing or a widening may occur, as is shown in FIG. 12.

In this figure the same elements are found, but it can be seen that the gluing by the layer 2 of the flanges 45 and 47 onto the panels 31 and 33 does not guarantee the perfect application of these panels to the outer surfaces of the flanges 35 and 47 since there are spaces (voluntarily enlarged) A and B.

Although this situation does not affect directly the solidity and rigidity of the container, the spaces A and B can be the cause of tearing or wedging of the contents in the compartments in such a way that it is useful to avoid the forming of such spaces in any way possible.

According to a feature of the invention, the flanges 45, 46, 47 and 48, applied against the panel 31, 32, 33 and 34 integral with the frame 30, have interruptions 49a, 49b, or 49c, through which the layer 2 adheres to the inner face of the corresponding panel 31, 32, 33 or 34 which is integral with the frame 30, up into the area as close as possible to the bottom 40.

In FIGS. 13 and 14, a modification has been set forth schematically of the embodiment where the interruptions 49a are formed by spaces which determine at least two flanges 45a-45b, 46a-46b, 47a-47b, 48a-48b on a panel integral with the frame 30.

In FIG. 14 it can be seen that the thermo-formed synthetic layer 2 is applied against the panel which is integral with the frame 30 in that it is placed into the space 49a which allows to divide by two the free length of the outer panel which is susceptible to causing a "width" A or B.

It is, of course, possible to obtain a still better result in providing not only a single space 49a which creates two flanges but two or several spaces which create a plurality of flanges. But then the outer panel which is integral with the frame 30 is practically held on points on a large part of its length whereby any width-formation is avoided.

According to another modification shown in FIG. 15, the spaces 49a are formed by at least one groove provided in a single flange 45, 46, 47, 48.

It can be seen in FIG. 15 that the groove 49b allows a portion of the flange z to exist in such a way that the layer 2 which holds the flange 46 applied against the panel 32, leaves a small portion of this panel unglued on the same height z, but this is not of great importance, because what is essential is to carry the gluing of the exterior panel sufficiently down, i.e. close to the bottom 40, to avoid any width-forming.

Between the solution of the FIGS. 13 and 14, on the one hand, and the solution of FIG. 15 on the other hand, the best compromise is chosen, which, without leaving too large a width between the bottom of the corresponding panel integral with the frame 30, nevertheless allows gluing of the panel integral with the frame 30 as close as possible to the bottom 40.

FIG. 16 shows another modification of this embodiment according to which the spaces 49c are formed by holes which traverse the cardboard from one side to the other, constituting the flanges 45, 46, 47 and 48.

It can be seen that the thermo-shaped layer 2 penetrates in points into each of the holes 49c and maintains the corresponding panel which is integral with the frame 30 not only in its lower portion but in the area spread out substantially over the surface of the corresponding flange, with the object of avoiding both the width-formation of type A and B shown in FIG. 12 or even a deformation by distention of the exterior panels which are integral with the frame 30.

According to a modification of the invention, it is provided to place against the inner surfaces of the walls a sheet of a material having special qualities, especially of thermic insulation. The same material can be provided at the inside of the cover (flat or hollow) to obtain a container which is both tight and insulating and thus well adapted for holding cold products like icecream or hot products like meals reheated in the container itself.

Said sheet is held fixed by the layer 2. To assure said fixing, the sheet must extend slightly below the height of the wall so that the layer 2 can be glued there. It is also possible to provide several holes through which the layer 2 reaches the cardboard of the walls, but they must be more numerous so as not to destroy the thermic insulation.

DESCRIPTION OF THE PROCESS OF MAKING

It is also an object of the invention to provide a process for making a container of the type described above, characterized in that by cutting and grooving blanks of two different types, which include the one of the first type, 10, a frame 30 and panels 31, 32, 33 and 34 which are integral with the interior sides of the frame 30, the one of the second type 11, a bottom 40 and the panels 41, 42, 43 and 44 which are integral with the exterior sides of said bottom 40; then the steps of placing first a blank of the first type 10, and thereafter on top thereof at least one blank of the second type 11 in a correct position above a die 60, whose form and inner dimensions correspond to the form and outer dimension of the container obtained, then holding the frame 30 of the blank of the first type 10 applied against the edge of the die 60 and holding the blank or the blanks of the second type 11 so they cannot move laterally and/or changed orientation, then exerting a vertical pressure on the common plane of the superimposed blanks 10 and 11 which is directed toward the bottom of the die 60 in order to cause simultaneously the bending of the panels 31, 32, 33 and 34 which are integral with the frame 30, toward the bottom of the die, the folding of the panels 41, 42, 43 and 44 which are integral with the bottom 40, in the sense opposite to the preceding sense and the penetration of the bottom 40 of the blank 11 from above up to the bottom of the die 60 by the inside of the frame 30 so that all the panels 31 to 34 of the frame and 41 to 44 of the bottom 40 are placed against each other, side by side, according to the same alinement of their surfaces by pressure against the walls of the die 60, the applying, preferably by thermo-forming a tight layer 2 of synthetic material so that it extends and adheres to the bottom 40, onto all panels 31 to 34 and 41 to 44 and on the frame 30, and then by all the elements being held and formed, in combination with the layer 2, into a rigid and tight package which is suited for optional holding a cover by fastening to the layer 2, positioned above the frame 30.

In order to carry out this process, either a continuous or a discontinuous method can be used.

In the first case, the blanks 10 and 11 are cut from cardboard which comes off rolls, then the blanks are superimposed as shown in FIG. 17, this is followed by the process of thermo-forming the layer 2 as is known per se, and, in particular by using a "chain of cups" which replaces the die 60 from location to location.

In the second case, blanks 10 and 11 are used which are already cut and they are superimposed as shown in FIG. 17.

In both cases it is possible to carry out the superimposition of the two blanks 10 and 11 by means of a punch, then the layer 2 is placed by thermo-forming onto the cardboard blanks which are held in an appropriate position, or it is possible to attain simultaneously the putting in place of the blanks 10 and 11 and thermo-forming of the layer 2.

Figure 18:
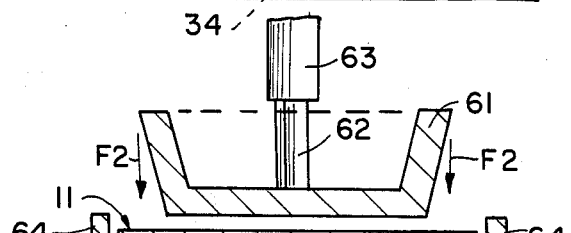
FIGS. 18, 19 and 20 are sectional schematic views which show the association of two cardboard blanks according to FIG. 17.
Figure 19:
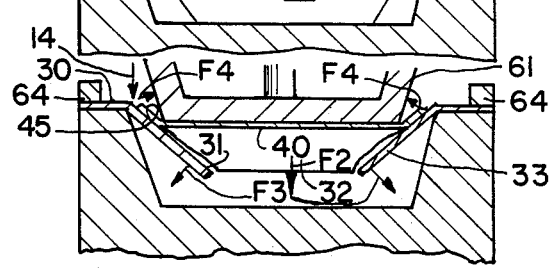
Figure 20:
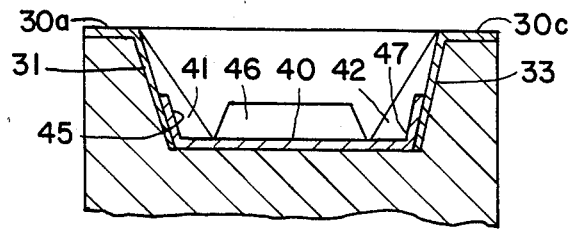

In FIGS. 18 to 20 a method of making is shown according to which one proceeds in two steps, the first one of putting in form the cardboard blanks and the second one of thermoforming the synthetic layer.

These figures illustrate a modification of the process according to the invention, characterized in that the vertical pushing onto the common plane of the blanks 10 and 11 is carried out by means of a retractable punch 61 and that thereafter the layer 2 is applied, preferably by thermo-forming.

FIG. 18 illustrates the two superimposed blanks 10 and 11 in the position shown in plan view in FIG. 17, and, thereabove, the punch 61 placed relative thereto. This is an explanatory sketch, showing a rod 62 of a hydraulic jack 63.

When the hydraulic pressure is established in the jack 63, the rod 62 comes down just as the punch 61 in the sense of the arrows F 2, while the blanks are held and in particular the frame 30 is strongly applied against the edge of the die 60 by the elements 64 which are placed between the points of the triangular panels 41, 42, 43 and 44 and extend above the frame 30 when the two blanks 10 and 11 are superimposed.

In FIG. 19 an intermediate position is shown in which the punch 61 has started to descend and has begun to constrain the panels 31, 32, 33 and 34 to bend downward in the sense of the arrows F 3. At the same time the punch 61 pushes the bottom 40 in the sense of the arrow F 2 and forces the panels 41, 42, 43 and 44 to be adjusted at the same time as the flanges 45, 46, 47 and 48 are moved in the sense of the arrows and according to the groove lines 50 and 51, respectively.

FIG. 20 shows the two blanks 10 and 11 completely folded and put into shape, with the punch 61 being in a removed position and for this reason not being visible.

The two blanks 10 and 11 stay substantially together in the position shown, due to the fact that the panels 41, 42, 43 and 44 are in a way fitted in between the panels 31, 32, 33 and 34 since they are all alined to form the walls of the container.

One can now put a sheet of synthetic material into place, either by thermo-forming or by fitting onto a blank.

In both cases the said synthetic material must adhere to the entire inner surface of the container and to the upper surface of the frame 30, and one can, as is known per se, either put glue on the synthetic material itself or on the blanks 10 and 11.

According to another modification of the inventive process, the vertical push onto the common plane of the blanks 10 and 11 occurs at the same time as the thermoforming, i.e. by the layer 2 itself, by means of compressed air which is applied against said layer 2.

Figure 21:
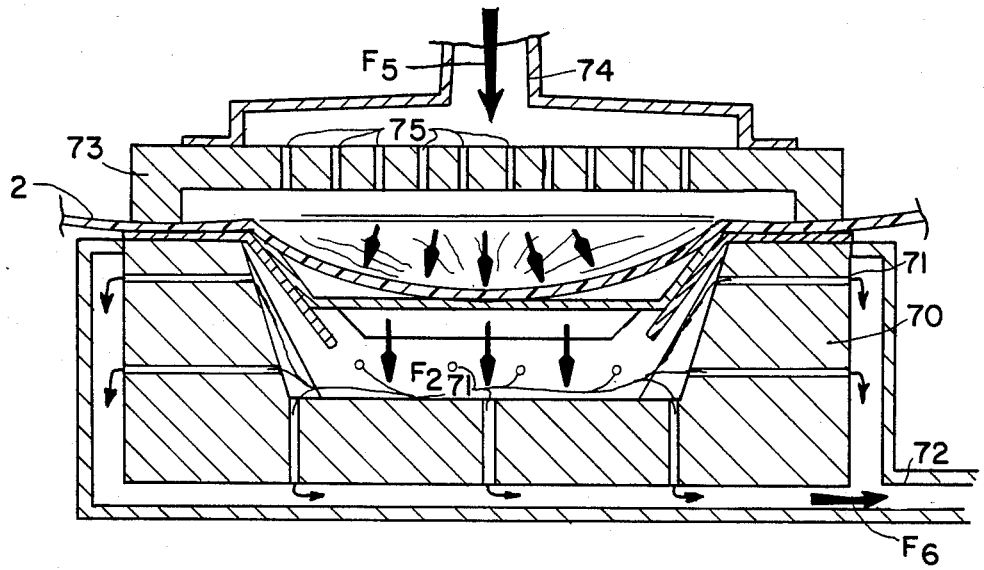
FIG. 21 is a sectional schematic view showing the simultaneous putting into place of two cardboard blanks and one thermo-formed layer to obtain a container according to the invention in one single operation.

In FIG. 21 a schematic section is shown of a device for thermo-forming which comprises, on the one hand, as is known per se, a die 70 which is connected by passages 71 and a tubing 72 with means suitable for creating a vacuum and, on the other hand, a cover 73, connected by a tubing 74 to a source of compressed air which is distributed by the passages 75.

Associated with this unit is a device (not shown) which allows lifting of the cover 73 and guiding a sheet of synthetic material 2 perpendicularly to the die 70, above the two superimposed blanks 10 and 11 in the same manner as has been described above in connection with FIGS. 18 to 20.

The frame must also be solidly held, for example by providing a peripheral circumference which is integral with the frame 30 so that the cover 73 is applied tightly on the unit without impeding the bending movements of the panels 41, 42, 43 and 44 and the flanges 45, 46, 47 and 48.

When the two blanks 10 and 11 are superimposed and are in the desired position, the cover 73 is lowered and, as is known per se, the layer 2 is heated, then compressed air is led in according to the arrow F 5 so that this air is distributed through the passages 75 and ends above the layer 2.

At the same time, a vacuum is formed according to the arrow F 6 in such a way that the layer 2 exerts on the bottom 40 of the blank 11 a vertical push on the common plane of the blanks 10 and 11, with said vertical push being in the sense of the arrows F 2, thus forcing the different panels to bend as explained above.

As the layer 2 is distended, the vertical push along the arrows F 2 is completed by a lateral push which, in combination with the vacuum effect, applies against the panels 41, 42, 43 and 44 against the walls of the die 70. As stated above, the layer 2 adheres to the entire inside of the container and to the outside of the frame 30 to give the package its finished state.

It is possible to interrupt the vacuum and arrival of compressed air, as is already known, lift the cover 73 and and cut at the same time the layer 2 and the periphery of the cardboard frame 30 in order to give it its final exterior dimensions.

The container is then removed from the die 70 and can be filled and covered, as desired, or stockpiled to be used later.

It is seen that according to the invention the frame 30, being in one piece and placed on the edges of the die, constitutes a fixed reference plane throughout the forming of the container and its completion by putting in place the synthetic layer, and that in addition all other elements than the fixed frame 30 and the bottom 40 are bent naturally in the sense of a singular vertical push from top to bottom.

There is no movement which can impede the correct placing of the assembled portions, whether they are of cardboard or synthetic material.

Figure 22:
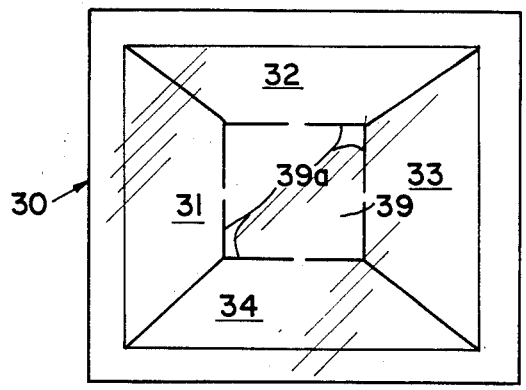
FIG. 22 is a plan view of a cardboard blank according to a modification of the invention.

FIG. 22 shows a modification of the process according to the invention in which the blank 10 of the first type is cut in such a way that the panels 31, 32, 33 and 34 remain connected among themselves by leaving a central portion 39 to which they are attached by very small tongues 39a. Under the effect of the vertical push onto the common plane of the blanks 10 and 11 they are broken, with the central portion 39 being on the bottom of the die 60 and under the bottom of the blank 11. It must be removed after completion of the container.

Thus it is easier to transport and stockpile the blanks 11 since the panels 31, 32, 33 and 34 do not risk to be bent accidentally during the different steps of handling.

At the time of formation of the container according to the process described in connection with FIG. 18 to 20 and 21, the central portion 39 is removed from the panels 31, 32, 33 and 34 when they begin to be bent in such a way that said portion 39 falls to the bottom of the die (60-70).

So that it does not form an obstacle to the correct placing of the bottom 40, the bottom of the die may be provided with some sort of cup whose depth is as exactly as possible equal to the thickness of the cardboard blank.

The invention is not limited to the embodiments shown and described but covers also all modifications.

We claim:

1. Process of making a container comprising an exterior portion of cardboard having a frame positioned in a single plane, wall panels and at least one bottom panel and a portion of a synthetic material formed of a single layer which is applied onto the surface of the cardboard portion forming the interior of the container and the exterior of the frame and which is adherent over the entire surface of the cardboard to which it is applied to maintain the relative position of the frame, the walls and the bottom panel comprising the steps of:

(a) providing a blank of a first type having a frame and a plurality of wall panels integral with the interior sides of the frame and a blank of a second type having a bottom panel and a plurality of wall panels integral with the exterior sides of said bottom panel;

(b) placing a blank of the first type and then at least one blank of the second type thereupon in a position and orientation with respect to a die hving the form and interior dimensions thereof corresponding to the exterior form and dimensions of the container to be made and whereby the frame of the blank of the first type is disposed over an edge of the die and the bottom panel of the blank of the second type is disposed substantially in vertical alignment with a bottom of the die;

(c) maintaining the frame of the blank of the first type applied against the edge of the die and maintaining the blank of the second type so that it cannot move laterally or change the orientation thereof relative to the form of the die;

(d) exerting a vertical push upon the common plane of the superimposed first and second blanks which is directed toward the bottom of the die to cause simultaneously the bending of the wall panels integral with the frame toward the bottom of the die, the folding of the wall panels which are integral with the bottom panel in the direction opposite to the direction of bending of the wall panels integral with the frame and the penetration of the bottom panels of the blank of the second type through the interior of the frame to the bottom of the die, so that all the wall panels integral with the frame and with the bottom panel are disposed in generally side-by-side, interfitted juxtaposition with the same alinement of the surfaces thereof by pressure against the walls of the die;

(e) applying a layer of synthetic material so that it extends over and adheres to the bottom panel to the frame and to all the wall panels whereby there is formed by the combination thereof a container which is rigid and tight.

2. The process according to claim 1, wherein the vertical push onto the common plane of blanks is carried out by means of a retractable punch, and the synthetic layer is applied thereafter.

3. The process according to claim 1, wherein said layer of synthetic material is applied by thermo-forming.

4. The process according to claim 3, wherein the vertical push is applied onto the common plane of the blanks at the time of thermoforming of the layer of synthetic material, by means of compressed air which is applied onto said layer.

5. The process according to claim 1, wherein the blank of the first type that wall panels remain interconnected by a central portion to which they are attached to three small tongues which are to be cut by the effect of the vertical push onto the common plane of the the blanks, whereby the central portion falls on the bottom of the die and under the bottom panel of the blank of the second type and is removed after forming of the container.

* * * * *